United States Patent [19]

Vinciguerra et al.

[11] 4,415,185
[45] Nov. 15, 1983

[54] FLEXIBLE METAL COUPLING FOR JOINING UNDERWATER PIPES LAID AT GREAT DEPTH

[75] Inventors: Costantino Vinciguerra, Florence; Giampaolo Bonfiglioli, Inzago, both of Italy

[73] Assignees: Nuovo Pignone S.p.A., Florence; Snam S.p.A., Milan, both of Italy

[21] Appl. No.: 263,158

[22] Filed: May 13, 1981

[30] Foreign Application Priority Data

May 26, 1980 [IT] Italy .............................. 22313 A/80

[51] Int. Cl.³ .......................................... F16L 13/04
[52] U.S. Cl. .................................. 285/114; 285/226; 138/120; 138/121
[58] Field of Search ....................... 285/114, 226, 223; 138/120, 121

[56] References Cited

U.S. PATENT DOCUMENTS

| 2,314,776 | 3/1943 | Dittus et al. | 285/114 X |
| 2,713,503 | 7/1955 | Ekholm | 285/226 X |
| 3,135,295 | 6/1964 | Ziebold | 285/226 X |
| 3,266,059 | 8/1966 | Stelle | 285/223 X |

Primary Examiner—Dave W. Arola
Attorney, Agent, or Firm—Hedman, Casella, Gibson, Costigan & Hoare

[57] ABSTRACT

A pliable metallic joint for underwater pipelines laid at great depths, having a bellows-like section of a pliable metal or alloy, which is externally reinforced by a sturdy metal wire coiling positioned in the grooves of said bellows and which is internally reinforced by interlockingly arranged U-shaped rings and an axial undulated circular spring that allow a high degree of deformation and facilitate joining two pipes.

3 Claims, 4 Drawing Figures

FLEXIBLE METAL COUPLING FOR JOINING UNDERWATER PIPES LAID AT GREAT DEPTH

This invention relates to a new type of entirely metal flexible coupling which enables two underwater pipes laid out of alignment or variously inclined at great depth to be effectively, permanently and rapidly connected together. The present ever-increasing requirement for laying underwater pipe for oil and gas pipelines at ever-increasing depths and thus on sea beds which are of increasing roughness makes it highly desirable to have available flexible couplings which, by enabling the rigidity of the pipe to be broken and then the misaligned and/or variously inclined section of pipe to be connected together without excessive force. The practice of this invention allows any roughness of the sea bed to be easily overcome.

In the present state of the art, two different types of flexible coupling are known, the first of which is substantially coupled by two tubular metal sleeves which are joined together in a sealed manner by means of a spherical coupling pair, i.e. by a coupling formed from male and female hollow metal balls between which seal gaskets are placed. In this manner, the two sleeves can be set at will at any contained angle by rotating them about the spherical coupling pair, i.e. by sliding the spherical surfaces of the coupling pair along the interposed seal gasket. This coupling is obviously strong as it is constructed entirely of metal, but it has a serious seal problem when laid at a great sea depth, i.e. in a strongly corrosive environment represented by sea water, and in the presence of potentially abrasive elements such as incrustations and sand grains. In this respect, the seal gasket, which is limited to one annular band of modest width, is thus subjected to continuous deterioration by corrosion and by the continuous relative sliding between said spherical surfaces of the coupling pair caused by underwater currents, so that it inevitably loses much of its quality in time, thus prejudicing the effectiveness of the coupling. The other known type of flexible coupling is made substantially from plastics reinforced by fairly sophisticated methods using spirally wound metal wires or plates.

This second type of coupling obviously obviates the aforesaid drawback of the first type, in that the facility for deformation is no longer concentrated in a spherical coupling pair, but is now distributed over the entire pipe portion, and there is no longer the need for a seal gasket which can deteriorate. However, this type of coupling also has a serious drawback due substantially to the use of plastics, which have poor reliability with time, in that as they age, their impermeability towards the conveyed fluid and their structural behaviour can vary considerably. The object of the present invention is to obviate the drawbacks of known flexible couplings while preserving their merits, and to thus provide a new type of flexible coupling of which the facility for deformation is distributed over its entire length, although being constructed entirely of metal. This is attained by constructing the flexible coupling with a composite metal structure in which each element, besides performing its own particular function, also cooperates with the other elements of the structure in order to attain the characteristics necessary for a coupling which is required to operate at great sea depth.

More specifically, the composite metal structure constituting the flexible coupling of the invention comprises a strongly deformable intermediate structure including a preformed metal bellows, i.e. obtained by forming a tube from its inside, its purpose being to provide a seal against the pressure difference between the inside and outside of the coupling; an outer strengthening structure constituted by closed steel rings disposed about said metal bellows in the grooves which resist any internal pressures greater than the external hydrostatic pressure; and an inner reinforcing structure which resists the axial tensile and compressive stresses and cooperates with said intermediate structure in resisting an external hydrostatic pressure greater than the internal pressure. The inner reinforcing structure includes an aligned series of closed steel rings of U cross-section, which are kept side-by-side and coupled with each other in succession in an axial direction by an overlying series of steel rings of inverted U cross-section, of which the lips of their profile are inserted respectively into the groove of two adjacent rings of the underlying series of U rings, said rings of inverted U cross-section being open in order to allow said insertion.

The flexible coupling of the invention also comprises two tubular metal sleeves fixed by one of the various available methods to the free ends of the two underwater pipes to be connected together. In turn the sleeves are respectively fixed under sealed conditions to the ends of the metal bellows of said composite metal structure by welding an end metal ring, and comprising a circumferential groove into which a lip respectively of the first and last ring of said overlying series of open steel rings of inverted U cross-section of said composite metal structure is inserted. In other words, the flexible coupling for joining two underwater pipes laid out of alignment or variously inclined at great depth, said coupling comprising two tubular metal sleeves to be fixed to the free facing ends of said underwater pipes, is characterized, according to the invention, in that said sleeves are connected together by a composite flexible metal structure comprising a strongly deformable intermediate structure constituted by a metal bellows, the ends of which are respectively fixed in a sealed manner on to said sleeves by welding an end metal ring, an outer strengthening structure including closed steel rings disposed about said bellows in its grooves, and an inner reinforcing structure including an aligned series of closed steel rings of U cross-section which are kept side-by-side and coupled with each other in succession in an axial direction by an overlying series of open steel rings of inverted U cross-section, of which the lips of their profile are inserted respectively into the groove of two adjacent rings of the underlying said series of U rings, while the first and last ring of said overlying series of open steel rings of inverted U cross-section have one of their lips inserted respectively into a circumferential groove provided in said tubular metal sleeves.

The advantages of the coupling of the invention are immediately apparent.

First, because there are no seal gaskets which can deteriorate, and the coupling is constructed entirely of metal, it is extremely robust, lasting and reliable. Moreover, it is able to effectively resist even large pressure differences directed either towards its interior or towards its exterior. Finally, the coupling has high deformability in all directions. In this respect, the deformability of the coupling is provided substantially by the facility of the rings of said inner reinforcing structure to move relative to each other by a distance equal to the axial gap by way of which each U ring is connected to the overlying inverted U ring, and by the flexibility of the lips in contact with said rings. However, as the coupling is constituted by several rings, it follows that the sum of a large number of small translations and rotations of the individual rings results in the facility for high deformation of the coupling, which enables it to easily connect together the ends of pipes which are even considerably out of alignment or mutually inclined. In fact, in order to further increase the facility for deformation of the coupling, according to a further characteristic of the present invention between each lip of said open steel rings of inverted U cross-section and each facing lip of said closed steel rings of U cross-section, and each facing lip of said circumferential grooves of the tubular metal sleeves there is inserted an axially undulated circular spring which resiliently and alternately presses against said facing lips.

In this manner, it is possible to keep the facing lips of said rings spaced apart by a distance H equal to the sum of the amplitude of the axial undulation and of the thickness s of said spring, the distance H obviously being able to diminish during operation by the effect of pulling or bending, until it reaches said thickness s of the spring, due to the fact that as this latter becomes compressed it straightens its axial humps until finally a substantial axial gap is created between the facing lips equal to the amplitude of the undulation of said spring.

The invention is described hereinafter with reference to the accompanying drawings, which illustrate a preferred embodiment thereof given by way of non-limiting example in that technical or constructional modifications can be made thereto without leaving the scope of the present invention.

Figure 1:
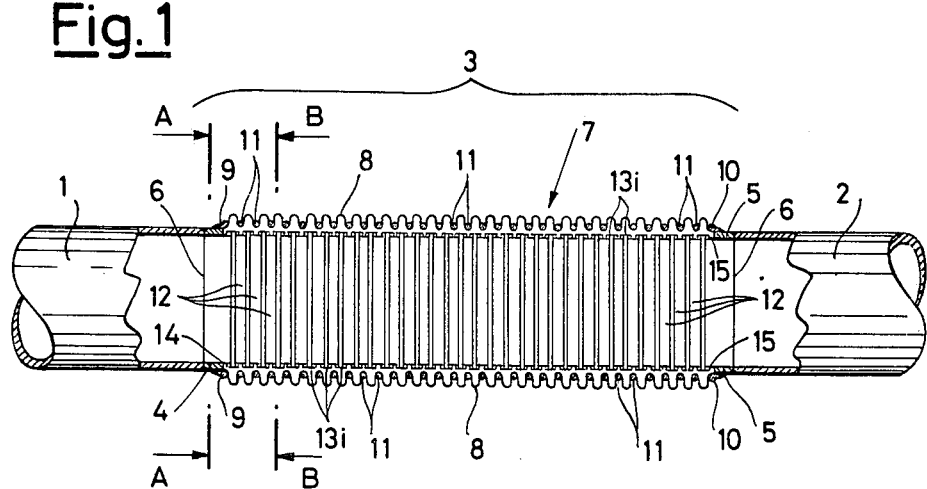
FIG. 1 is a longitudinal view partly in section of two underwater pipes connected together by a flexible coupling according to the invention.

With reference to the figures, 1 and 2 indicate two underwater pipes laid at great depth and of any orientation, to be connected together by means of a flexible coupling 3. The coupling 3 has two tubular metal sleeves 4 and 5 which are fixed, respectively, to the free facing ends of said pipes 1 and 2 by means of a weld 6 (as shown in the figures) or by other means known from the state of the art. The pipes 1 and 2 and sleeves 4 and 5 are connected together by a flexible composite metal structure 7.

The composite structure 7 has a highly deformable intermediate structure constructed substantially in the form of a metal bellows 8 obtained by forming a tube from its inside. The ends of the bellows 8 are fixed in a sealed manner on to said sleeves 4 and 5 by end metal rings 9 and 10, respectively, welded thereto.

The metal bellows 8 are strengthened externally by an outer strengthening structure comprising a series of closed steel rings 11 which are disposed about said bellows during its formation, in positions corresponding to the grooves. Inside the bellows 8 there is an inner reinforcing structure comprising an axially aligned series of closed steel rings 12 of U cross-section, which are kept side-by-side and coupled in succession with each other and with said metal sleeves 4 and 5 by an overlying series of steel rings 13$i$ (where i=1,2,3 . . . ), of inverted U cross-section, of which the lips 13' and 13" of their profile (see specifically FIG. 2) are inserted respectively into the groove of the U cross-section of two underlying adjacent rings 12. Also the first and last rings of the overlying series of rings of inverted U cross-section 13$i$, have one lip 13' or 13", respectively, inserted into one of the circumferential grooves 14 and 15 provided in said metal sleeves 4 and 5.

Figure 2:
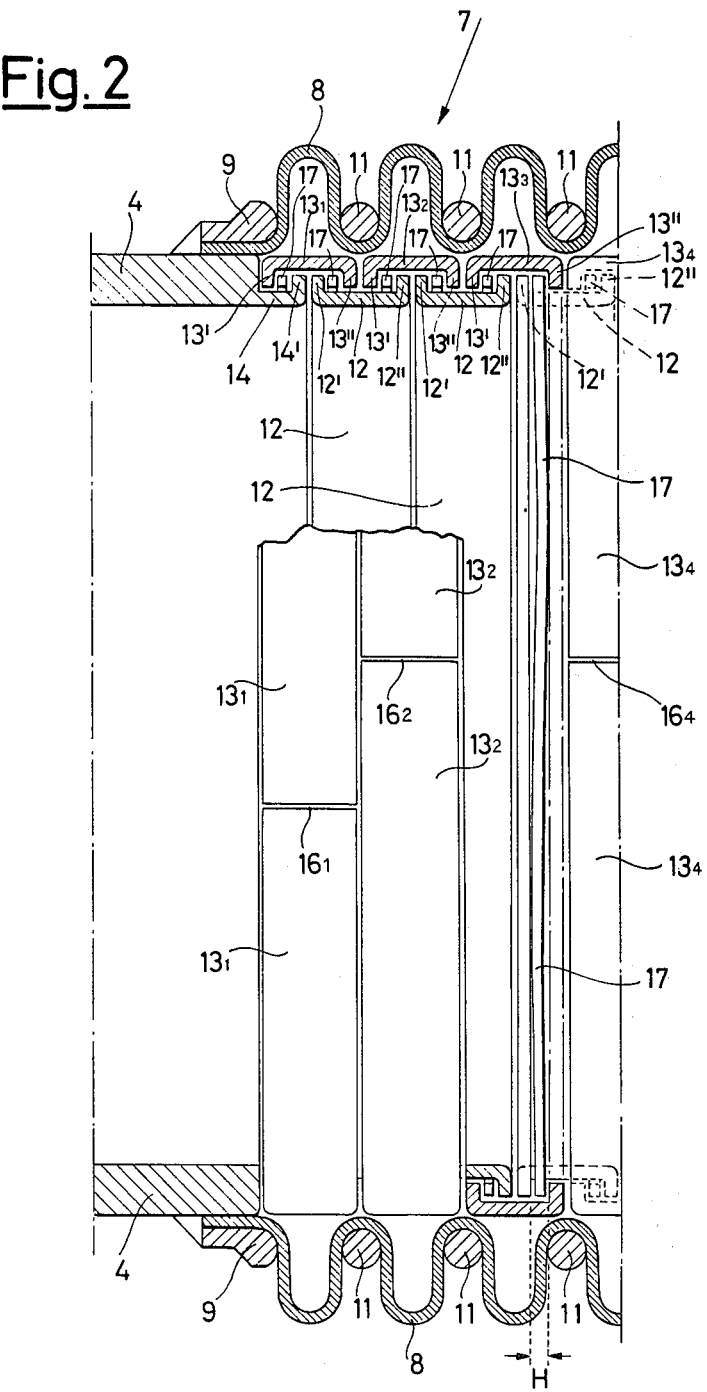
FIG. 2 is a longitudinal view, partly in section, and on an enlarged scale of the flexible coupling according to the invention, taken between the lines AA–BB of FIG. 1.

It is apparent that in order for said insertion operations to take place, the rings of inverted U cross-section 13$i$ must be open, i.e. divided into two parts by axial cuts 16$i$ (see FIG. 2).

Figure 3:
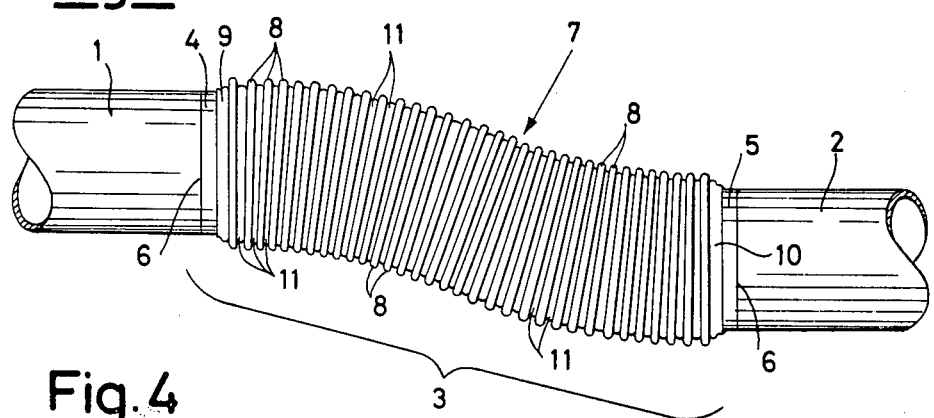
FIG. 3 shows the deformation undergone by the flexible coupling according to the invention for connecting together two underwater pipes laid out of alignment.
Figure 4:
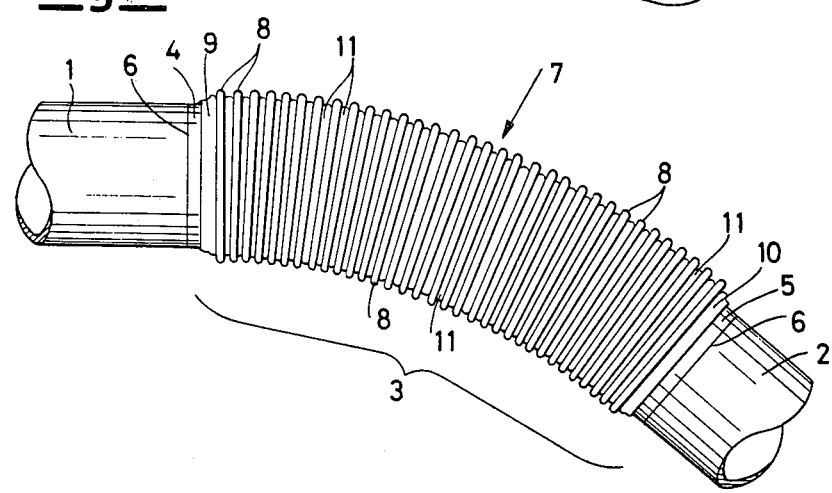
FIG. 4 shows the deformation undergone by the flexible coupling according to the invention when connecting together two underwater pipes laid mutually inclined.

Finally, between each lip 13' and 13" of said open steel rings of inverted U cross-section 13$i$, and each facing lip 12" and 12' respectively of said closed steel rings of U cross-section 12, and each facing lip 14' respectively of said circumferential grooves 14 of the metal sleeves 4 and 5, there is inserted an axially undulated circular spring 17 which by resiliently pressing by means of the humps of its axial undulation alternately against said facing lips and thus keeping them resiliently spaced apart by a distance H (see FIG. 2), makes it possible for said facing lips to make a substantial relative movement to the extent of a distance (H-s), where s is the thickness of the spring, as the result of a straightening of the humps of its axial undulation due to squeezing, thus giving the coupling high deformability which makes it suitable for easily connecting together the ends of underwater pipes, even if considerably out of alignment (see FIG. 3) or mutually inclined (see FIG. 4).

As already stated, the invention is not limited to a flexible metal coupling such as that described, and instead of using rings of revolution, the coupling can be constructed with helically extending elements.

In other words, the bellows 8 can be constructed from corrugated sheet metal wound helically about itself, the outer strengthening rings 11 can be constructed from a single round bar of steel wound as a helical spiral in the grooves of said bellows 8, and finally the two series of U rings 12 and 13 can each be constructed from the helical extension of a U-shaped sheet metal strip.

In this manner, starting simply from sheet metal strips and round bars and using suitable machinery it is possible to simply and immediately construct not only flexible couplings but also entire flexible pipes of indefinite length for the underwater conveying of fluids or gases, and these could be kept wound on large diameter drums in considerable lengths and then unwound only when they are required to be laid, this thus being extremely rapid and reliable.

We claim:

1. A flexible coupling for joining two pipes which can be laid under water at great depths out of alignment and at different inclines, comprising:
   metal bellows intermediate the free facing ends of the pipes,
   means secured to said pipes for fixing each end of said metal bellows to an end of a pipe in a sealed manner, closed steel rings disposed about said bellows in its grooves for strengthening the coupling, an inner reinforcing structure having an aligned series of steel rings of U-shaped cross-section kept side by side and coupled to each other in succession in an axial direction by an overlying series of steel rings of inverted U-shaped cross-section, wherein the lips of said inverted U-shaped steel rings are inserted into the grooves of two adjacent rings of the underlying series of said U-shaped steel rings, and an axial undulated circular spring inserted between each lip of said inverted steel rings and each facing lip of said underlying steel rings which resiliently and alternately press against said facing lips to allow a high degree of deformation of the coupling.

2. The flexible coupling of claim 1, wherein:

said means includes two tubular metal sleeves, each of which is fixed to a free facing end of the pipes, and has a circumferential groove at the free end thereof with a facing lip, each of said bellows is fixed onto one of said sleeves by a metal ring about an end of said bellows and welded to said sleeve, said first and last ring of said overlying series of said inverted steel rings have one of their lips inserted into one of said circumferential grooves in said sleeves, and said undulated circular spring also is between the lips of said inverted ring and the facing lips of circumferential grooves of said sleeves.

3. The flexible coupling of claim 2, wherein said inverted rings are divided into two parts by axial cuts therein to facilitate assembly of said inner reinforcing structure.

* * * * *